US006910001B2

(12) United States Patent
Hammersley et al.

(10) Patent No.: US 6,910,001 B2
(45) Date of Patent: Jun. 21, 2005

(54) DISTRIBUTED MULTIRESOLUTION GEOMETRY MODELING SYSTEM AND METHOD

(75) Inventors: Richard P. Hammersley, Austin, TX (US); Hong-Qian Lu, Austin, TX (US)

(73) Assignee: Schlumberger Technology Corp., Houston, TX (US)

(*) Notice: Subject to any disclaimer, the term of this patent is extended or adjusted under 35 U.S.C. 154(b) by 833 days.

(21) Appl. No.: 09/815,127

(22) Filed: Mar. 22, 2001

(65) Prior Publication Data

US 2001/0039487 A1 Nov. 8, 2001

Related U.S. Application Data

(60) Provisional application No. 60/191,354, filed on Mar. 22, 2000.

(51) Int. Cl.[7] ............................. G06F 17/10; G06T 17/00
(52) U.S. Cl. ........................... 703/2; 345/420; 345/423; 345/428; 709/203
(58) Field of Search ............................. 703/2; 345/418, 345/420, 423, 428, 419, 442; 702/2; 709/201, 203

(56) References Cited

U.S. PATENT DOCUMENTS

| | | | |
|---|---|---|---|
| 5,566,281 A | 10/1996 | Tokumasu et al. | 345/420 |
| 5,590,248 A | 12/1996 | Zarge et al. | 345/421 |
| 5,621,872 A | 4/1997 | Tokumasu et al. | 345/442 |
| 5,929,860 A | 7/1999 | Hoppe | 345/419 |
| 5,995,109 A | 11/1999 | Goel et al. | 345/423 |
| 6,078,331 A | 6/2000 | Pulli et al. | 345/423 |
| 6,108,006 A | 8/2000 | Hoppe | 345/423 |
| 6,128,577 A | 10/2000 | Assa et al. | 702/2 |
| 6,191,787 B1 * | 2/2001 | Lu et al. | 345/418 |
| 6,313,837 B1 * | 11/2001 | Assa et al. | 345/420 |
| 6,373,489 B1 * | 4/2002 | Lu et al. | 345/428 |
| 6,426,750 B1 * | 7/2002 | Hoppe | 345/428 |

FOREIGN PATENT DOCUMENTS

| | | |
|---|---|---|
| EP | 0 805 418 A2 | 11/1907 |
| EP | 0549944 | 7/1993 |
| EP | 0 784 295 A2 | 7/1997 |
| WO | WO 98/27498 | 6/1998 |
| WO | WO 00/04506 | 1/2000 |
| WO | WO 00/19380 | 4/2000 |
| WO | WO 00/42576 | 7/2000 |

OTHER PUBLICATIONS

Huerta et al., J. Binary Space Partitioning Trees: A Multi-resolution Approach, IEEE Conference on Information Visualization, Aug. 1997, pp. 148–154.*

Hubeli et al., A. Multiresolution Models for Nomanifold Models, IEEE Transactions on Visualization and Computer Graphics, vol. 7, No. 3, Jul.–Sep. 2001, pp. 207–221.*

Salous et al., M. CBIT—Context–Based Image Transmission, IEEE Transactions on Information Technology in Biomedicine, vol. 5, No. 2, Jun. 2001, pp. 159–170.*

Barat et al., C. Geometrical and Physical Models of a 3D Range Finder, IEEE, Sensors, vol. 2, Jun. 2002, pp. 895–900.*

(Continued)

*Primary Examiner*—Russell Frejd
(74) *Attorney, Agent, or Firm*—Pehr B. Jannson; Danita Maseles

(57) ABSTRACT

A distributed multiresolution modeling system has a database management system on a first server. The database management system provides access to a hierarchical tree representation of surfaces of geometric models. Client programs executing on computers connected to the first server accesses and updates the model by traversing the hierarchical tree representation until a terminating criterion has been satisfied. During the traversal the client programs request quad-tree nodes from the database management system.

4 Claims, 17 Drawing Sheets

OTHER PUBLICATIONS

Assa, S. et al., "Feature–Based Geomectic Modeling for Geoscience", *GOCAD ENSG Conference, 3D Modeling of Natural Objects: A Challenge for the 2000'*, Jun. 4–5, 1998.

Bode, T. et al., "First Experiences with GEOSTORE, an Information System for Geologically Defined Geometries", Lecture Notes in *Computer Science*, Feb. 1, 1994, pp. 35–44, XP002064462.

Cignoni, P. et al., "Multiresolution Representation and Visualization of Volume Data", *IEEE Transactions on Visualization and Computer Graphics*, US, IEEE Service Center, Piscataway, NJ, vol. 3, No. 4, Oct. 1, 1997, pp. 352–369, XP000730968.

Hoppe, H., "Progressive Meshes", *SIGGRAPH '96*, 1996, pp. 99–108.

Jones, C.B., "Data structures for three–dimensional spatial information systems in geology", *International Journal of Geographical Information Systems*, Jan.–Mar. 1989, UK, vol. 3, No. 1, ISSN 0269–3798, pp. 15–31, XP002064461.

Kofler, M., "R–Trees for Visualizing and Organizing Large 3D GIS Databases", Doctoral Thesis, Technischen Universitat Graz. URL: http://www.icg.tu–graz.ac.at/upload/thesis/index.html, Oct. 27, 1998.

Laakko, T. et al., "Feature modelling by incremental feature recognition", *Computer–Aided Design*, vol. 25, No. 8, Aug. 1993, pp. 479–492.

Lounsbery, M. et al., "Multiresolution Analysis for Surfaces of Arbitrary Topological Type", *ACM Transactions on Graphics*, vol. 16, No. 1, Jan. 1997, pp. 34–73.

Meyer, F.G. et al., "Tracking Myocardial Deformation Using Phase Contrast MR Velocity Fields: A Stochastic Approach", *IEEE Transactions on Medical Imaging*, US, IEEE Inc., New York, vol. 15, No. 4, Aug. 1, 1991, pp. 453–465, XP000629476.

Pajarola, R., "Large Scale Terrain Visualization Using the Restricted Quadtree Triangulation", *Visualization 1998*, pp. 1–9.

Pratt, M.J., "Synthesis of an Optimal Approach to Form Feature Modelling", *Proceedings of the ASME International Computers in Engineering Conference and Exhibition*, San Francisco, CA, Jul. 31–Aug. 4, 1988, pp. 263–274.

Roelofs, L.H. et al., "Applying Semantic Data Modeling Techniques to Large Mass Storage System Designs", Mass Storage Systems, 1990, 10th *IEEE Symposium*, pp. 65–76.

Simmons, R.G., "Representing and Reasoning About Change in Geologic Interpretation", *Technical Report 749*, MIT Artificial Intelligence Laboratory, Dec. 1983, pp. 6–21, 108–111, and 119–121.

Taylor, D.C., et al., "An Algorithm for Continuous Resolution Polygonalizations of a Discrete Surface", *Proceedings of Graphics Interface*, CA, Toronto, ON, May 18, 1994, pp. 33–42, XP002113898.

Wang, S. et al., "Shape Simplification of Free–Form Surface Objects for Multi–Scale Representation", *IEEE International Conference on Systems, Man and Cybernetics. Cybernetics*, US, New York, IEEE, 1996, pp. 1623–1628, XP00736361.

Wyatt, K. D., et al., "Building velocity–depth models for 3–D depth migration", *The Leading Edge*, vol. 13, No. 8, Aug. 1994, pp. 862–866.

Young, J. A., et al., "A Computer–Aided Geological Interpretation System for Subsurface Imaging", *Geoscience and Remote Sensing*, vol. 2, 1994, pp. 854–856.

Hwang, Sam C. Hwang, et al., Efficient View Sphere Tesselation Method Based on Halfedge Data Structure and Quadtree, Computer Graphics, Pergamon Press Ltd., Sep. 1, 1993.

Jung, Y. H., et al., Tetrahedron–based Octree Encloding for Automatic Mesh Generation, Computer–Aided Design, Butterworth–Heinemann Ltd., Mar. 25, 1993, No. 3, London, GB.

Walker, M. Boolean Operations with Enriched Octtree Structures, Computers & Graphics, Pergamon Press, 1989, vol. 13 No. 4, Oxford, GB.

\* cited by examiner

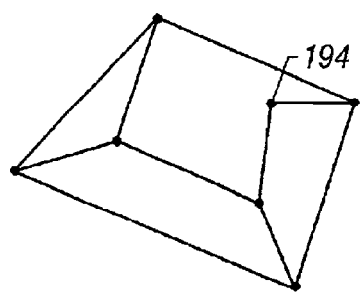  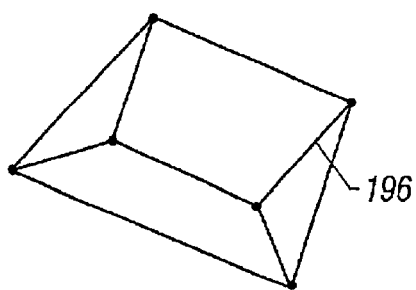
FIG. 8A          FIG. 8B
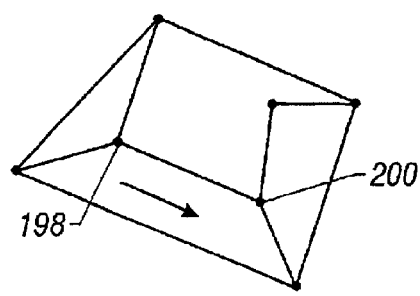  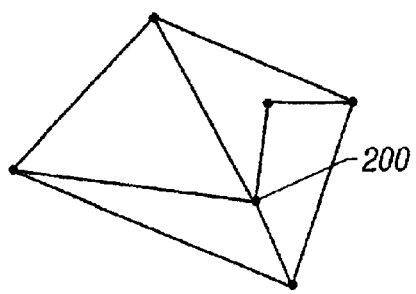
FIG. 9A          FIG. 9B

US 6,910,001 B2

DISTRIBUTED MULTIRESOLUTION GEOMETRY MODELING SYSTEM AND METHOD

This application claims the benefit of U.S. provisional application No. 60/191,354 filed on Mar. 22, 2000.

TECHNICAL FIELD

This invention relates in general to the field of geometric modeling, and in particular, multiresolution geometric modeling in a distributed environment.

BACKGROUND OF THE INVENTION

Many disciplines require large high-resolution geometric models. High-resolution models of complex systems, such as geological reservoir models, often require huge data sets and therefore exceed the capacity of generally deployed hardware.

The last decade of the 20th century saw great advances in computer technology. One example is the widespread use of computer networks such as the Internet. The near universal access to computer networks provides new ways of using computers. For example, the client-server computation model has become very popular. In the client-server approach a user accesses a data set stored on a "server" computer using a user interface or application program on a "client" computer. In networked computer systems it is possible to allow the various computers that make up the network to have different roles in an overall solution. For example, one computer may provide database storage, another high-speed computation, a third graphics, and a fourth client interface. In a network it is also possible to have multiple computers working in parallel to solve a given problem.

Even though computer network bandwidth has increased substantially in recent years, due to the size of many geometric models their rapid transmission over a network is not practical.

For many applications, the manipulation and analysis of a geometric model does not require the highest available resolution. Furthermore, it is often desirable to access part of the model at a high resolution and other parts of the model at a lower resolution. Co-pending patent application Ser. No. 09/163,075 entitled Modeling at More Than one Level of Resolution, filed Sep. 29, 1998 (hereinafter '075) and Ser. No. 09/228,714 entitled Scalable Visualization for Interactive Geometry Modeling, filed Jan. 12, 1999 (hereinafter '714), both of which are incorporated herein by reference, describe systems and methods for building models at more than one level of resolution as well as for visualizing multiresolution models. These applications describe a method and system in which a dynamic multiresolution model may be created or updated without requiring the complete rebuild of the model when new elements are added or elements are changed. For example, geoscience models are usually made up of a large number of surfaces called horizons. According to the methods of '075 and '714 surfaces may be added to the model without requiring a complete rebuild of surface representations.

It would be desirable to provide a mechanism for distributed access and distributed interactive construction of multiresolution geometric models.

BRIEF DESCRIPTION OF THE DRAWINGS

FIG. 3b is a boundary representation illustrating the zero-cells and one-cells bounding the area cell (two-cell) of FIG. 3a.

FIGS. 8a–b illustrate the effect of removing a non-critical vertex through approximation.

FIGS. 9a–b illustrate the effect of removing a critical vertex through approximation.

DETAILED DESCRIPTION OF THE PREFERRED EMBODIMENTS

Overview of a Distributed Multiresolution Geometric Modeling System

Figure 1:
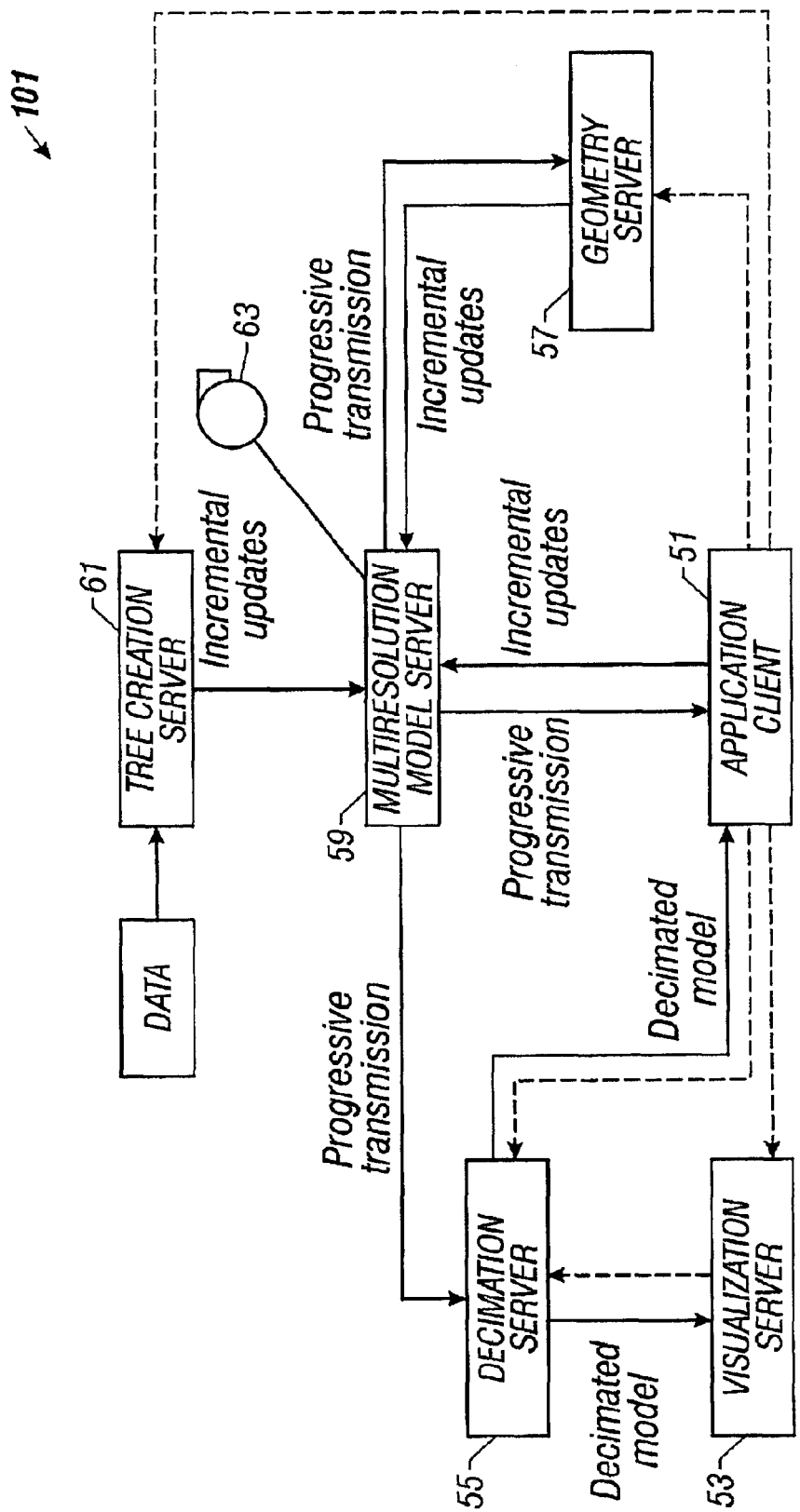
FIG. 1 is a schematic diagram of a distributed multiresolution geometric modeling system according to the invention.

FIG. 1 is a schematic diagram of a distributed multiresolution modeling system according to the invention. The system 101 consists of an application client 51, a visualization server 53, a decimation server 55, a geometry server 57, a multiresolution model server 59, and a tree creation server 61. In one view of the invention, each of these units 51 through 61 are distinct software components that may be operating on the same computer or be distributed over multiple computers. In the extreme, each of the units 51 through 61 operates on a separate computer. In the latter case, the units 51 through 61 have client-server relationships as described in greater detail below. In the other extreme, the visualization server 53, the decimation server 55, the geometry server 57, the multiresolution model server 59 and tree creation server 61 are located on one computer and the application client on another computer.

While the multiresolution modeling system 101 is shown in FIG. 1 for illustrative purposes with one visualization server 53 and one application client 51, in an alternative embodiment there may be multiple visualization servers and application clients. There may also be multiple decimation servers 55 and geometry servers 57, for example, so that each visualization server is provided decimated views of the model from a dedicated decimation server, or to provide parallelization of the model building process over multiple geometry servers.

Central to the system 101 is the multiresolution model server 59. The multiresolution model server 59 hosts the multiresolution representation of a geometry model stored on a persistent storage 63. Co-pending patent application Ser. No. '075 describes in detail the construction of geometry models at multiple levels of resolution.

The controlling unit of the system 101 is the application client 51. The application client 51 may be any application program that accesses a geometry model. In the geoscience field, examples include 3D visualization, interactive 3D modeling, and simulation. A web browser is another example of an application client. The application client 51 issues commands to the other components of the system 101. Given a model, the application client 51 may issue a command to load an additional element, e.g., a surface, into the model.

Figure 3A:
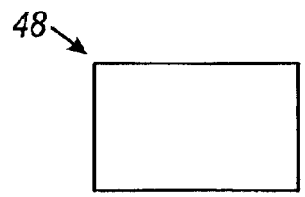
FIG. 3a is a graphic representation of an area cell (two-cell).
Figure 3B:
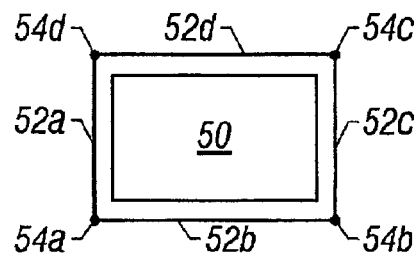
Figure 3C:
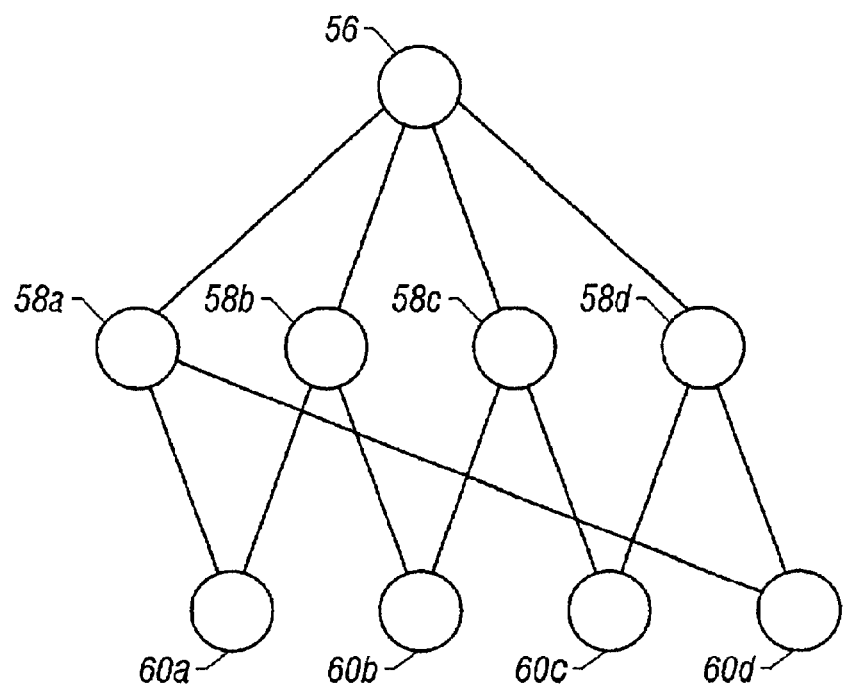
FIG. 3c is a connected graph illustrating the connection between the various zero-cells, one-cells, and two-cells of FIG. 3b.

The model combines topological information about the structure being modeled and geometric information describing the shape of the structure. In summary, expanded in greater detail below, the topological information is contained in a graph, e.g., as shown in FIG. 3c and the geometric information is modeled in a hybrid grid-mesh representation. The grid is subdivided into a quad tree structure.

The topology of a model is represented as a boundary representation. In the boundary representation the macro-topology is represented by cells. A cell is a path-connected subset of Euclidean space of a fixed dimension.

Surfaces which make up the model are introduced to the model as grid data 65. The tree creation server 61 receives surface grid data as input and builds quad tree representations of the surface. The details of how a quad tree representation is constructed are discussed in greater detail below.

During the process of creating the quad tree representation of a surface, the tree creation server 61 transmits incremental updates to the multiresolution model server 59.

Topology and Geometry

The system 101 distinguishes between the notions of topology and geometry. Broadly, topology refers to the connectivity between components in the model and generally refers to "macro-topology", described below. Geometry refers to the actual point-set representation of a particular component, for example.

Macro-topology carries the relationships between the major topological components of a model. The major topological components refer to points, edges (curves), faces (surfaces), and subvolumes. For example, macro-topology would answer a question such as "which surfaces bound a particular volume?" or "which surfaces lie within a particular volume?".

Figure 2A:
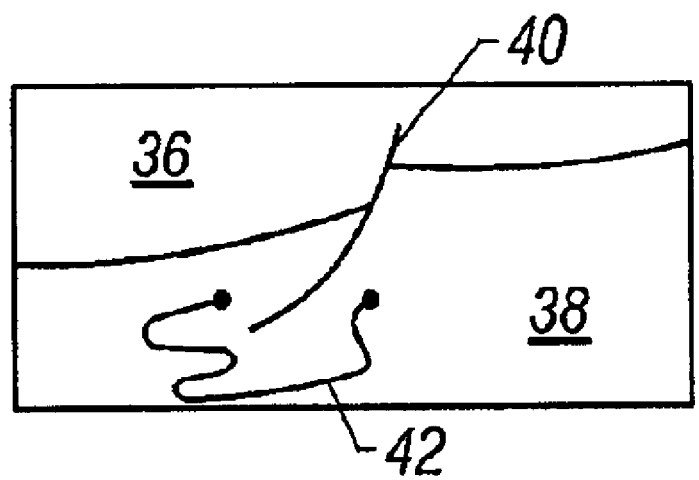
FIG. 2a is a graphic representation of a model showing a connected path.
Figure 2B:
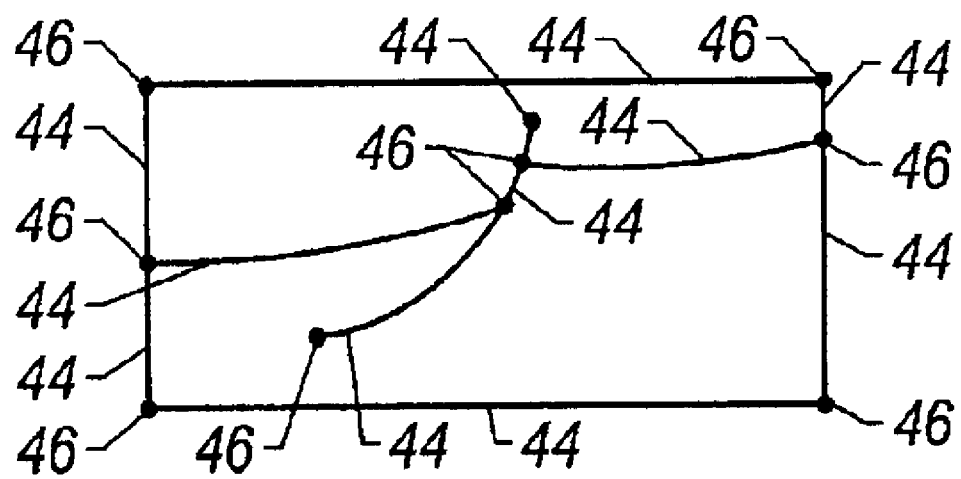
FIG. 2b is a graphic representation of a boundary representation of a geometry model.

Macro-topology is represented by cells. A cell is a path-connected subset of Euclidean space of a fixed dimension. Path-connected means any two points in the cell can be connected by a path in the cell. The dimension refers to the dimension of the geometry of the cell, a 0-cell is a point, a 1-cell is an edge (curve), a 2-cell is a face (surface) and a 3-cell is a volume. For example, consider FIG. 2a. Areas 36 and 38 are distinct cells separated by fault 40. Curve 42 illustrates the path-connected character of cell 38. Similarly, as shown in FIG. 2b, the line segments 44 between intersection points and the intersection points 46 themselves are cells.

The macro-topology of a geometric model is the set of all cell-cell connectivity relationships. The cell-cell connectivity relationships can be represented in a graph in which the arcs of the graphs represent connectivity and the nodes represent cells, as shown in FIGS. 3a–c. In a cellular model, cells of dimension n are connected to boundary cells of dimension n−1 and vice versa. For example, in the topology of a box 48, shown in FIG. 3a, the area cell 50 is connected to its four bounding edge cells 52a–d. A single cell can act both as a boundary and as a region. For example, a surface can bound a subvolume, but can itself be bounded by a set of curves. The 1-cells 52a–d, in FIG. 3b, are both subregions (bounded by zero-cells 54a–d) and boundaries (of area cell 50). These relationships can be represented graphically, as shown in FIG. 3c. Node 56, corresponding to area cell 56, is connected to nodes 58a–d, representing 1-cells 52a–d, respectively. The connection between the nodes is represented by the arcs between them. 1-cells 58a–d are connected to zero-cells 60a and 60d, 60a and 60b, 60b and 60c, and 60c and 60d, respectively. Cells which are contained in higher-dimensional cells but do not split them (such as fault 40 in FIG. 2a) are said to be "embedded".

There are two discrete surface representations which are of interest, grid and mesh. In any surface representation there are two important aspects, the micro-topology and the geometry. Micro-topology refers to how the surface is connected, for example, which triangles connect to which triangles. The geometry specifies the actual position of the surface. The primary distinction between grid and mesh is grid represents topology implicitly, mesh represents topology explicitly.

There are several types of grid. They share a common feature which is that topology is represented implicitly. They differ in how the geometry is represented. The topology is represented implicitly as two integer extents giving the number of grid cells in each direction.

Figure 4A:
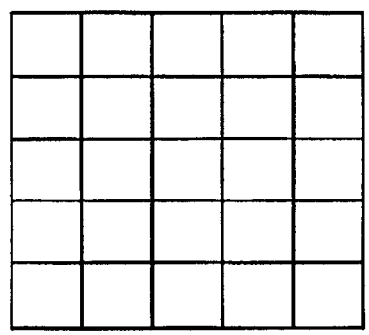
FIGS. 4a–c illustrate grid representations.

The most compact form of grid is a "regular grid", as illustrated in FIG. 4a. For a regular grid it is only necessary to store an origin, step values for the grid points, the number of grid points and the height values for each grid point. A regular grid has a number of drawbacks. In particular, all of the grid cells are of fixed size and only height fields can be represented.

Figure 4B:
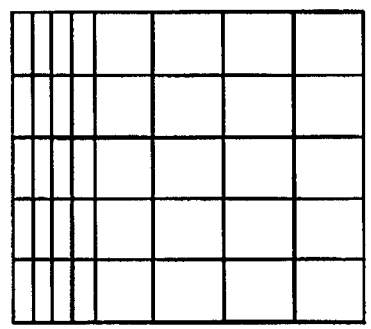

A slightly more general form of grid is a "rectilinear grid". For a rectilinear grid the grid cell sizes can vary along each axis, as illustrated in FIG. 4b. As with regular grids, however, only height fields can be represented.

Figure 4C:
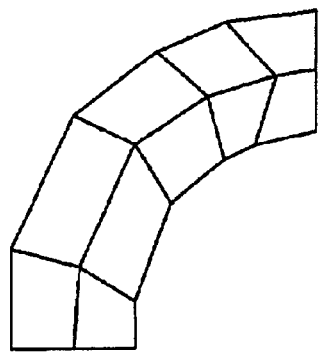

The most general type of grid is a "structured grid", as illustrated in FIG. 4c. As with regular and rectilinear grids, the topology is represented implicitly by two integer extents giving the number of grid cells in each direction. The geometry is represented explicitly by maintaining a three dimensional point coordinate for each grid point. A structured grid differs from regular and rectilinear grids because it is possible to represent multi-valued height fields. It is also more adaptive than regular and rectilinear grids allowing the grid cell size to vary across the whole grid.

Structured grids have the following characteristics: (1) they are compact; (2) they can represent multi-valued height fields; (3) topology is represented implicitly in that grid cell neighbors are given by increments and decrements of an indexing function; (4) the grid index is a natural parameterization; and (5) they are difficult to edit.

The major drawback of all grid representations is the inability to topologically edit the grid. For example, it is easy to move a vertex in a structured grid by replacing the coordinates. It is difficult to insert a new vertex into the grid, which would require regenerating the grid indices for the surface.

Figure 5:
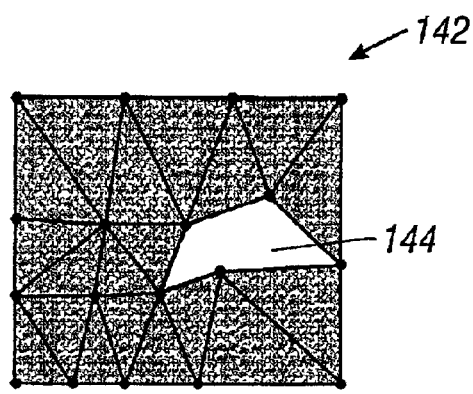
FIG. 5 illustrates a mesh representation of a surface.

The greatest advantage of a mesh representation is the ability to represent irregular geometries. A mesh 142 with an irregular hole 144 can be represented very simply, as shown in FIG. 5. Where a surface is rapidly changing the mesh can be very fine, and in large flat regions the mesh can be very coarse. It is also very easy to edit a mesh. For example, if a new vertex needs to be inserted, it is possible to retriangulate the surface in the neighborhood of the vertex.

Mesh has the following characteristics: (1) triangles are of variable size; (2) they can represent multi-valued height fields; (3) topology is represented explicitly; (4) locally editable, for example refinement and coarsening; (5) not necessarily parameterized.

Meshes can represent more general surfaces than grids. Compared to a grid, however, a mesh incurs a memory and performance cost because the topology has to be represented explicitly. However, because a mesh is irregular it can easily model multi-valued surfaces and surfaces which are rapidly changing in one area and flat in another.

When creating any surface representation, the sampling size can have a profound effect on memory usage. For example, if the sampling along each axis of a grid is doubled, the memory usage will be quadrupled. This suggests the need to selectively load portions of the model in core memory.

Furthermore, it is easy to build a geometric model which can reside in core memory, but which overwhelms even the most powerful graphics hardware. This suggests the need to be able to decimate or subsample the surfaces in an efficient manner for rendering.

The system 101 uses the hierarchical surface representation introduced in co-pending patent application Ser. No. '075 which is able to represent a surface that is initially imported as a structured grid and is then edited by the use of classification and coherency. The representation supports the micro-topological interface required by the SHAPES geometry engine for a surface to be used in classification. The surface also supports adaptive decimation algorithms that prevent cracking and bubbling. The architecture is a hybrid-grid mesh. This means wherever possible a grid is used, but, when necessary, mesh regions overlaying the grid are used. This has many advantages, for example, being able to tune algorithms to make use of a grid representation when the surface is a grid. But, when greater flexibility is required, the grid representation can be exchanged for a mesh representation.

Figure 6A:
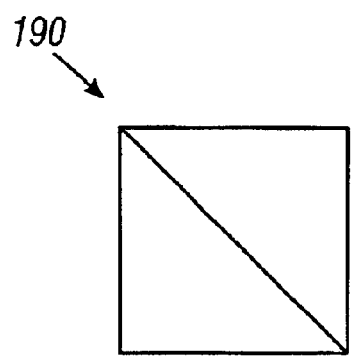
FIGS. 6a–b illustrate two possible triangulations of a grid cell.
Figure 6B:
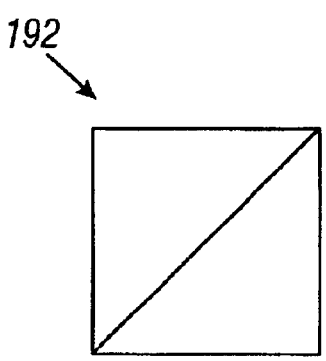

Typically, surfaces are imported as grids. However, the geometry engine can only perform geometric calculations with mesh. The hybrid grid-mesh representation neatly solves this problem, because areas of the grid can be dynamically converted to mesh thereby supporting general topological and geometrical editing. But, the efficient grid representation can be used where such general editing is not required. Effectively, the underlying geometry engine is fooled into believing the surface is a mesh. Furthermore, since it is possible to identify which areas are grid and which are mesh, algorithms can be optimized to make use of the grid structure whenever possible. An example of tuning when the surface is a grid is encoding the particular triangulation of the grid. A grid cell has two possible triangulations 190 and 192, as shown in FIGS. 6a–b.

The triangulation of the grid can be stored in a bit vector, each bit representing the chosen triangulation of a particular grid cell. In this way it is not necessary to maintain the triangulation of the grid explicitly as simplices.

In general, the grid can be thought of as being the background and the mesh the foreground. Since the surface maintains its grid representation in the background it is possible to discard the mesh foreground at any time and recover the grid background.

At any time a portion of the grid can be turned to mesh by reading the triangulation bit-vector and dynamically building simplices.

The hybrid architecture maintains the flexibility to provide the irregular refinement of a grid. This is important, for irregular refinement is required for efficient classification and coherency algorithms.

For the purposes of the implementation, a quadtree has been used to provide a multiresolution hierarchy. A quadtree was chosen because of its geometrical relationship to sub-sampling in grids.

Figure 7A:
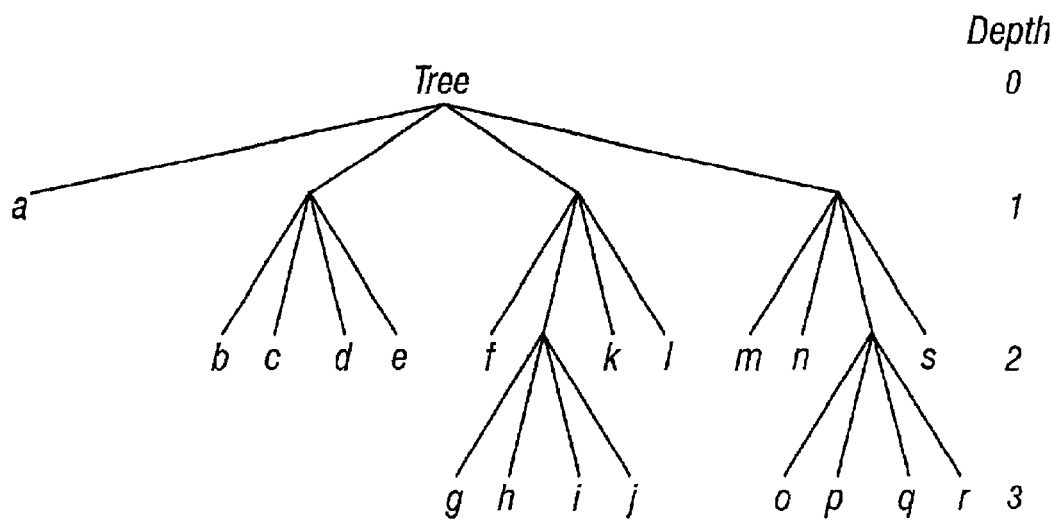
FIG. 7a is a graphical representation of a quadtree partitioning of a surface.
Figure 7B:
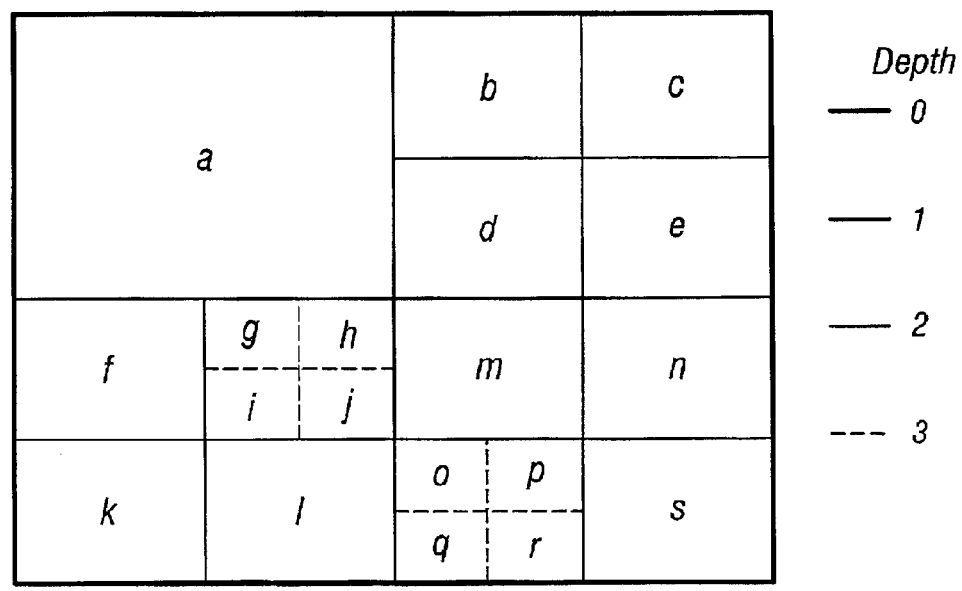
FIG. 7b is a geometrical representation of a quadtree partitioning of a surface.

A quadtree is a tree with nodes, each of which has four children, except for the leaf nodes, which have no children. Any quadtree can be drawn graphically, as shown in FIG. 7a, or geometrically, as shown in FIG. 7b. Every node of the tree has a unique depth and can be assigned a unique key.

The key of a quadtree node is chosen to provide the following functionality.

A compact and efficient way to dereference quadtree nodes.

A linear ordering for the quadtree nodes.

An efficient way to compute the depth of the key.

An efficient way to compute whether a key is an ancestor of another key.

An efficient way to compute whether a key is a descendant of another key.

A way to compute the ancestor keys of a key.

A way to compute the descendant keys of a key.

Efficient in this context means a small number (typically <5) of bitwise Booleans together with bit shifts and arithmetic operations. The implementation of the quadtree key can be done by using pairs of bits to hierarchically identify the child at each level and representing the depth as an integer. Let ceil(x) be the smallest integer greater than or equal to x. Using the implementation of the quadtree key described above, the number of bits required to represent a tree of depth d is given by $2d+\text{ceil}(\log_2(d+1))$, where the factor $2d$ is the mantissa (2 bits are required to identify each child at each depth), and the factor $\text{ceil}(\log_2(d+1))$ is the number of bits required to represent the integer value d. Thus a 32 bit key can represent a tree of depth 14, and as shall be seen this is more than adequate for current needs.

The following definitions will be used:

The number of elements (cardinality) in a collection C will be denoted by Card(C).

The key of a quadtree node N will be denoted by Key(N).

The quadtree node of a key K will be denoted by Node(K).

The depth of the key K will be denoted by Depth(K). Without loss of generality, the root key has depth 0.

The ancestor key at depth i of the key K will be denoted by $Ancestor_i(K)$. The function is defined for $i \leq Depth(K)$ with $Ancestor_{Depth(K)}(K)=K$.

Denote by $Ancestors_i(C)$ the collection of ancestor keys of the $$Ancestors_i(C) = \bigcup_{K \in C} Ancestor_i(K)$$

collection of keys C:

Note there is a one-to-one correspondence between nodes and keys:

Node(Key(N))=N, Key(Node(K))=K

For simplicity, and since the original surface is a structured grid, the quadtree leaf nodes are assumed to be all at the same fixed depth. It is possible for branches of the quadtree to be empty. To ensure unnecessary navigation across empty parts of the tree, if a node is present in the tree it must have a non-empty leaf node in its descendants.

Conceptually, all surfaces are represented as mesh. However, it is not necessary for the mesh to be completely built, in fact, it is possible to dynamically build the mesh as and when required provided sufficient topology is maintained to support geometrical and topological algorithms. Once an area of the surface is marked as mesh and simplices have been built for this region, more general, topological editing can be performed in this region, for example, refinement.

Following this paradigm, simplices are conceptually assigned to quadtree leaf nodes in a regular manner. As discussed above, this can be easily done for a grid. The quadtree leaf node maintains a flag that signifies whether its simplices have been built or not. If asked for its list of simplices the leaf node can return the list of simplices if they have been built, or build them dynamically and return the list. In this way a simplex is assigned to a unique quadtree leaf node.

The geometrical representation of a quadtree mirrors the regular structure of a grid and hence it is natural to assign each grid cell in a regular manner to a unique quadtree leaf node. For example, the geometric tiling of a quadtree described above can be used and the grid cell may be assigned to the quadtree leaf node that contains its lower left corner. When a grid cell is triangulated, it contains a pair of simplices. These simplices are assigned to the quadtree leaf node of their grid cell.

Each quadtree node has been assigned a collection of simplices. The quadtree node inherits a boundary from its collection of simplices, i.e., the boundary of the simplices. This boundary is a list of vertices and edges connecting the vertices. Furthermore, at a fixed depth in the tree, the boundaries of all the quadtree nodes at the chosen depth form a graph.

The graph of the boundaries of the quadtree node will be a particularly detailed object for it takes its edges from the simplices in the full-resolution surface. It would be preferable to approximate the boundary of the quadtree node with a reduced set of edges and hence a reduced set of vertices. For example, as shown in FIG. 8a, it can be seen that vertex 194 can be dropped and the edge 196 which it defines. The edge can be straightened, as shown in FIG. 8b, without changing the basic structure of the graph (more precisely, the topology of the graph has not changed).

In contrast, if vertex 198, shown in FIG. 9a, is collapsed to vertex 200, the valence of vertex 200 changes from three to four and hence the topology of the graph is modified. It can be seen that the only vertices which can be dropped and still preserve the topology of the graph are the vertices of valence two (such as vertex 194 in FIG. 8a). This can be made precise by introducing the notions of homeomorphic graphs. Graphs are well-known topological objects in mathematics and many techniques have been developed to study them.

From the description above, there is a collection of vertices that cannot be removed without changing the topology of the graph. These vertices are of interest as they encode the topology of the surface. However, it can be difficult to compute this collection of vertices. The following discussion describes a computationally cheap means to find a collection of vertices, called "critical vertices", which include the vertices described above.

The critical vertices are the crucial component when describing the topology of the surface. They enable navigation to be performed within the tree without requiring the complete tree to be loaded in memory. Moreover, they avoid creating unnecessary mesh regions to describe the geometry of the surface. The navigation is generally an important part of a surface description but is essential in the operation of making coherent.

The critical vertices are also crucial in the decimation stage because they are the vertices that will appear in the decimated model.

There are two classes of critical vertices: "internal" critical vertices and "external" critical vertices. The internal critical vertices are present to provide topological connectivity in the interior of the surface. The external critical vertices provide topological connectivity around the boundary of the surface and along cracks in the surface.

Again, the driving example is the sub-sampling of a regular grid. The critical vertices mirror sub-sampling in a regular grid.

Figure 10:
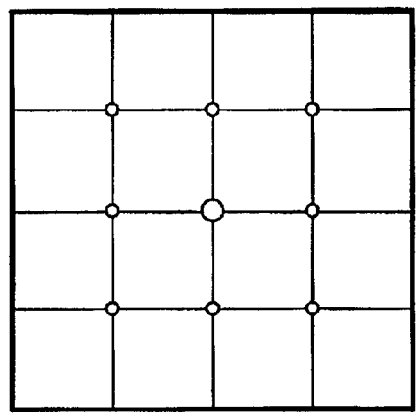
FIG. 10 illustrates internal critical vertices.

A vertex is an internal critical vertex if the vertex is in the interior of the surface and it can not be removed from the graph of edges without changing the topology of the graph. A vertex is critical at depth i if it is at the intersection of three or more quadtree nodes at depth i. For the regular partition of a grid, the critical vertices are the interior vertices of the sub-sampled grid, as can be seen in FIG. 10.

The internal critical vertices do not include the boundary vertices. To include these requires the macro-topology of the 2-cell to be used and gives the notion of an external critical vertex.

A vertex is an external critical vertex at depth i if it is:

A vertex which is identified with a 0-cell.

Figure 11:
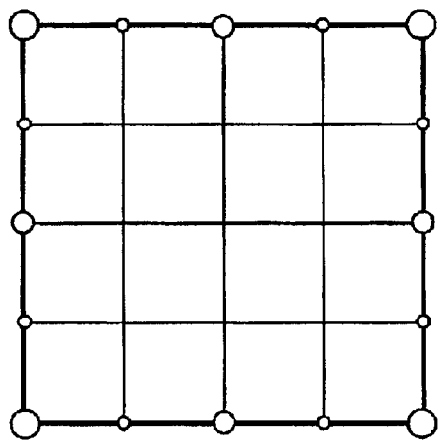
FIG. 11 illustrates external critical vertices.

A vertex which is identified with a 1-cell vertex and lies at the boundary of two or more quadtree nodes at depth i. The external critical vertices permit the boundaries to be included, as can be seen in FIG. 11.

The collection of critical vertices is the union of the internal critical vertices and the external critical vertices. One can see from the definitions if a vertex, v, is critical at depth d then the vertex is critical at all depths greater than d.

Figure 12A:
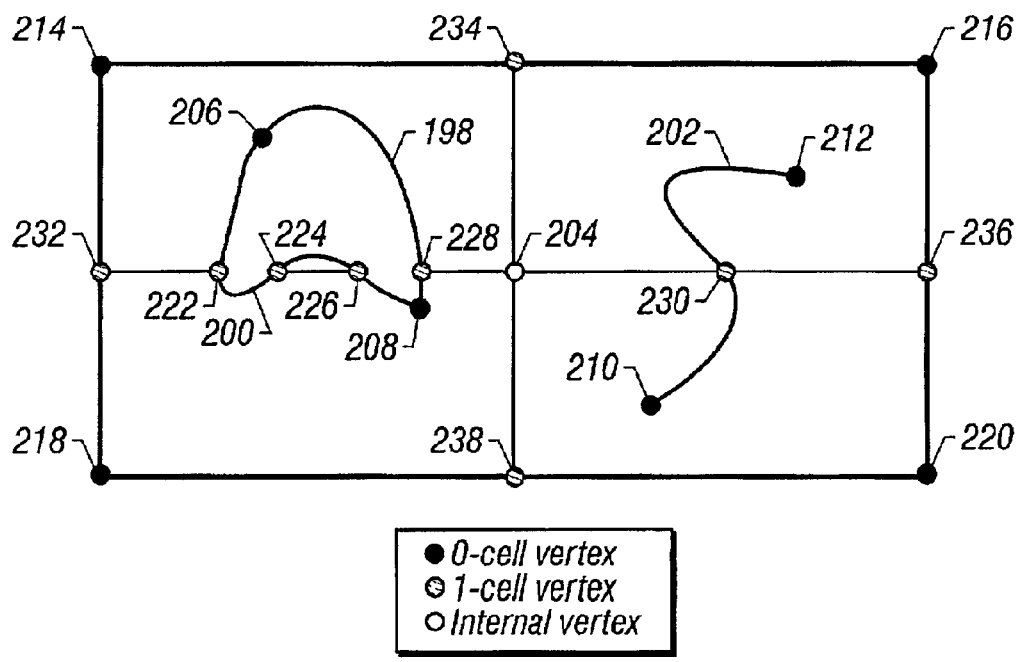
FIGS. 12a–b and 13a–b illustrate approximations of a surface while respecting critical vertices.
Figure 12B:
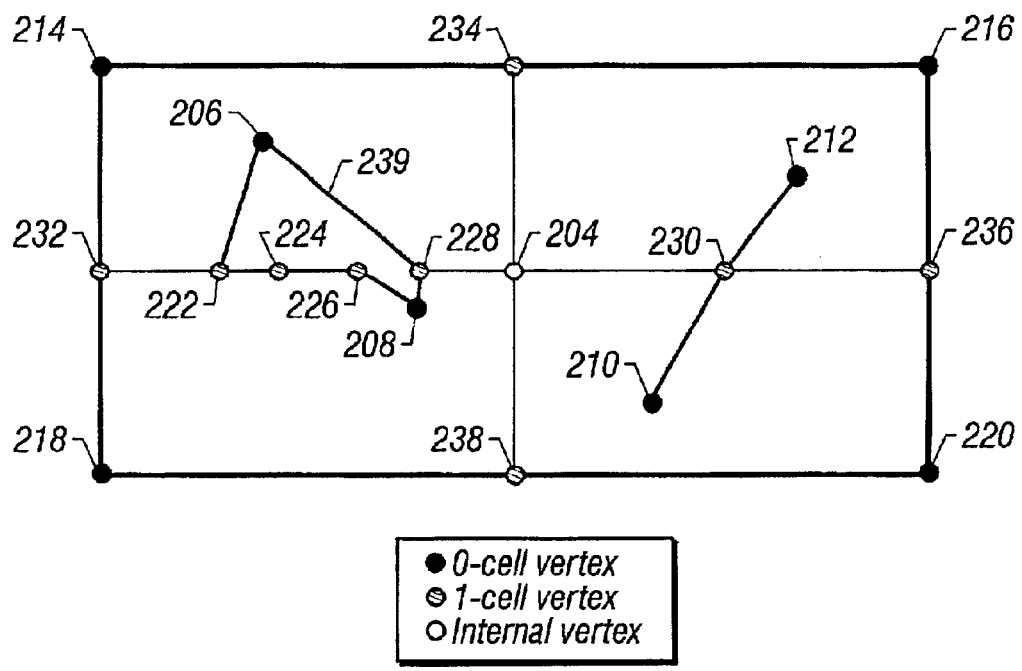

The "depth" of a critical vertex is the depth at which the vertex first becomes critical. If a vertex is never critical in the tree, it will first appear in the vertices of the simplices of a leaf node and its depth is given by the depth of the tree plus 1. The critical vertices represent an approximation of the surface and at greater depths of the quadtree the approximation improves. FIG. 12a shows an original surface with a hole comprising two 1-cells 198 and 200 and a crack comprising one 1-cell 202 with a quadtree overlaid. At this depth, there is only internal critical vertex 204 (occurring at the intersection of three of more quadtree nodes). There are external critical vertices 206, 208, 210, 212, 214, 216, 218, and 220 identified with a 0-cell. There are 9 external critical vertices 222, 224, 226, 228, 230, 232, 234, 236 and 238 identified with a 1-cell vertex of the surfaces and lying at the boundary of two or more quadtree nodes. FIG. 12*b* shows the approximation of the surface, hole and crack at this level of decimation. Curves between critical vertices are replaced by straight lines. For example, the portion of curve 198 between critical vertex 206 and critical vertex 228 is replaced by line 239.

Figure 13A:
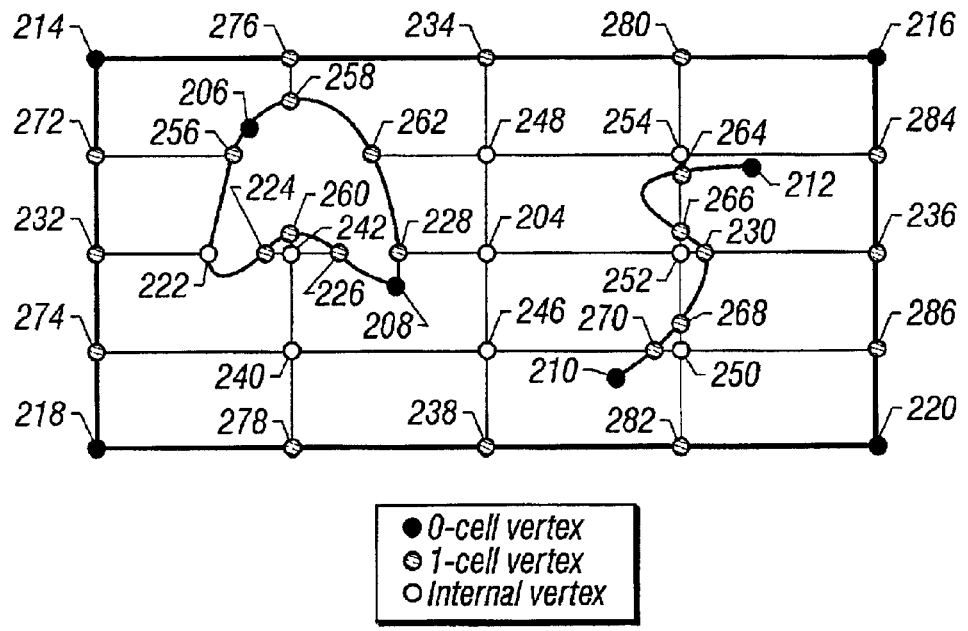
Figure 13B:
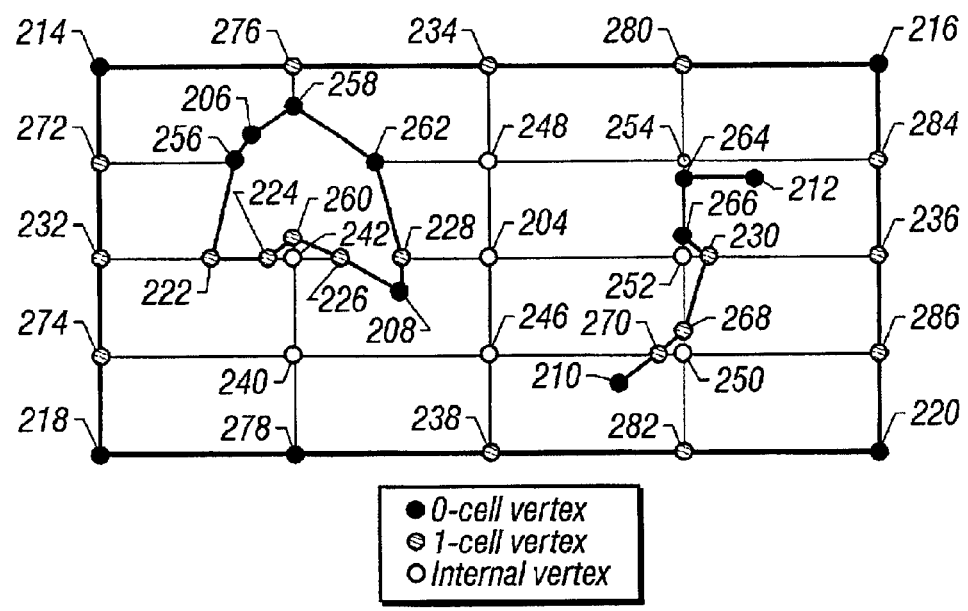

FIG. 13*a* shows the same original surface overlaid with a quadtree at a depth one greater than that shown in FIG. 12*a*. The number of quadtree nodes quadruples from four to sixteen. Consequently, seven interior critical nodes 240, 242, 246, 248, 250, 252 and 254 are added. Further, 1-cell external critical vertices at the boundary of two or more quadtree nodes 256, 258, 260, 262, 264, 266, 268, 270, 272, 274, 276, 278, 280, 282, 284 and 286 are added. FIG. 13*b* shows the approximation of the surface, hole and crack at this level of decimation. Again, curves between critical vertices are replaced by straight lines.

As can be seen, assigning critical vertices to a quadtree node allows a decimated view of a surface to be built. For the quadtree node, N, let $$CriticalVerts(N) = \{v | v \in Verts(S) \text{ for some } S \in Simps(N) \text{ and } depth(v) \leq depth(Key(N))\}$$

In its most abstract form, a 2-simplex is formed from three vertices. In a mesh, the connectivity of the surface can be represented by sharing the same vertex across different simplices and maintaining within a vertex references to the simplices which reference the vertex. So, given a simplex, one can navigate to one of its vertices and from the vertex can navigate back to another simplex. In this manner one can travel around the simplices and vertices in a surface.

In the hierarchical surface representation, connectivity is built in a different manner. Within each critical vertex, instead of storing the simplices which reference the vertex, the keys of the quadtree leaf nodes which have the vertex as a critical vertex are stored. This list of keys is called the vertex descriptor. In this manner, it is not necessary to instantiate simplices to be able to navigate around the surface. Navigation can be performed from a quadtree node by using the quadtree leaf keys from the vertex descriptor of one of its critical vertices to navigate to an ancestor node of the key.

More precisely, each simplex belongs to a unique quadtree leaf node and the simplex is conceptually assigned the key of this leaf node. In the mesh representation of the surface, a vertex is shared by a list of simplices (these simplices may not be instantiated). Thus, the vertex inherits a list of leaf keys from the keys assigned to the simplices that reference the vertex. This list, which is the vertex descriptor, is defined for all vertices in the surface and for the critical vertices is the same list as the one described in the paragraph above.

It is not necessary to store the quadtree leaf key in a simplex because it can be computed from the vertex descriptors of the simplice's vertices, as described below. However, for efficiency, it can be cached at the simplex.

Within a cell, denote by Simps(v) the set of simplices that connect to the vertex v. Denote by Verts(S) the set of vertices forming the corners of the simplex S. The "vertex descriptor" for the vertex v, is the list of leaf keys of the simplices connected to the vertex, v, $$Keys(v) = \bigcup_{S \in Simps(v)} Key(Leaf(S))$$

For performance, the tree is chosen such that the following condition is met:

$$Card(Keys(v)) \leq 4$$

By assigning the vertex descriptors to the vertices, it is possible to indirectly determine $$Key(Leaf(S)) = \bigcap_{v \in Verts(S)} Keys(v)$$

the leaf key of a simplex by

Having assigned the vertex descriptors to the vertices it is now a cheap operation to determine the criticality of a vertex at a particular depth of the tree.

$$dim(v) = \begin{cases} 0, \text{ if } v \text{ is identified with a } 0 - \text{cell vertex} \\ 1, \text{ if } v \text{ is identified with a } 1 - \text{cell vertex and no } 0 - \text{cell vertex} \\ 2, \text{ if } v \text{ is not identified with a } 1 - \text{cell or } 0 - \text{cell vertex} \end{cases}$$

Let dim(v)=macro-dimension(v). That is, let $$k_i(v) = Card(Ancestors_i(Keys(v)))$$

Let $k_i(v)$ be the number of ancestor keys at depth i of the vertex v, The vertex v is critical at level i if it satisfies any of the following:

The vertex v is identified with a 0-cell vertex.
The vertex v is identified with a 1-cell vertex and the number of ancestor keys at depth i is greater than one.
The number of ancestor keys at depth i is greater than two.
Equivalently, the vertex v is critical at level i if, $$k_i(v) > dim(v)$$

A quadtree node inherits a collection of simplices from the leaf nodes that are its descendants. If this collection of simplices does not reference any vertices that are identified with 0-cell or 1-cell vertices then, in the preferred embodiment, it is required that the collection of simplices must be homeomorphic to a 2-disk. In particular, the node must be connected and simply-connected (i.e. not have any holes).

This requirement improves the efficiency of the algorithms, in particular migration, and saves having to perform difficult topological analysis of the quadtree nodes. As will be seen, this requirement will be satisfied for all algorithms of interest provided the initial quadtree that is built satisfies the connectivity requirement.

The data structures of the quadtree has the following characteristics:

Grid cells are assigned to quadtree leaf nodes in a regular manner, as described above.
The initial triangulation of the surface is defined by splitting grid cells. The simplices from a split grid-cell are then assigned to the quadtree leaf node to which the grid-cell was assigned.
Each quadtree leaf node maintains the list of simplices which it contains. If the simplices have not been built, this list is empty. The simplices are built dynamically from the grid cells when required. When the simplices have been built, the quadtree leaf node is marked as mesh and the grid representation can no longer be used.

Each vertex is assigned a vertex descriptor that is the list of leaf keys of the simplices that use the vertex.

Each quadtree node maintains the list of vertices that are critical for this quadtree node at the quadtree node's depth.

Each quadtree node that has no vertices identified to 1-cell or 0-cell vertices in any of its descendants is topologically connected and simply connected.

A quadtree node is "pure grid" if none of its descendant leaf nodes have been meshed.

A "mesh" vertex is a vertex for which a simplex has been built which references this vertex.

A "grid" vertex is a vertex for which no simplices that reference it have been built.

A quadtree can be implemented in two basic forms. The first is to use a look up table based on the quadtree key, which can be done by using the ordering on the quadtree keys. The second is to maintain links from the parent to the four children nodes similar to a linked list. The first implementation will be called a linear array quadtree, the second implementation a linked quadtree.

A linear array quadtree is efficient for indexing on the key, but if large portions of the tree are non-existent it can be wasteful of memory. The linked quadtree is efficient where large portions of the tree are non-existent, but is inefficient for indexing on the key as it requires searching down the parent-child links.

The implementation of the quadtree uses both techniques. For the coarse depths the linear array is used and at the finer depths a linked tree is used. This provides faster indexing for coarse keys, but is not too wasteful of memory.

An iterator is provided for the tree, which maintains a key and provides efficient retrieval of the parent nodes. By using an iterator it is not necessary to maintain a key or the parent pointers in the quadtree nodes. They can be maintained in the iterator.

A bit tree is maintained which indicates whether a particular quadtree node is pure grid. This allows optimization on the basis that one knows whether a particular node is pure grid. For example, for a surface built from a regular grid, for a pure grid node, only the max z and min z values need be stored to recover a bounding box.

A bit vector for the grid cells is maintained which describes how a particular grid cell is split into simplices. This means it is not necessary to split all the grid cells to define the simplicial structure.

For grid vertices, there is no need to build their vertex descriptor, because keys can be generated on the fly for nodes that are pure grid. So vertex descriptors are only needed for mesh vertices. Furthermore, one knows a quadtree node that is pure grid has four neighbors and hence a pure grid node can be migrated easily.

The implementation of the quadtree maintains the following data structures and implements the following algorithms.

A bit vector, with one bit for each grid cell, to represent the triangulation of grid cells.

A bit tree, with one bit for each node in the quadtree, to determine if a node is present in the tree. This is necessary to determine whether a node is present in persistent storage.

A bit tree, with one bit for each node in the quadtree, to denote whether a node is pure grid or not. A node can be pure grid even though its boundary vertices may connect to mesh nodes. The bit tree is an efficient hierarchical encoding of the hybrid grid-mesh representation.

An iterator is used to navigate in the tree. Thus the nodes do not need to store parent pointers or keys.

Vertex descriptors are not needed for grid vertices.

Simplices are built only when required, e.g. to support intersection curves.

The quadtree key can be implemented in 32 bits.

Coarse levels of the tree are implemented as a linear array quadtree. Finer levels are implemented as a linked quadtree.

The mesh representation stored at the quadtree leaf nodes is the micro-topological representation defined in the SHAPES geometry engine. This is to save unnecessary conversion between different mesh representations when passing geometry to the SHAPES geometry engine. If a geometry engine had an alternate mesh representation it would be possible to use this representation instead.

The implementation of the algorithms is now discussed, beginning with classification.

At each quadtree node a bounding box is maintained which is large enough to contain all the simplices assigned to that quadtree node.

Multiresolution Server 59

The model resides on a persistent storage 63 connected to the multiresolution server 59. The model consists of the boundary representation, the topology graph, and the multiresolution surface representations. As discussed above, the multiresolution surface representations are a set of quadtrees, one for each two-cell in the boundary representation. Each node in the quad-tree contains a bounding box for all the simplexes that correspond to that node. Further, for each leaf node, the node contains the simplexes for that leaf node. For each node, a list of critical vertices associated with that node is stored on the persistent storage device 63. For each critical vertex, a vertex descriptor, a parameter value and an image value are stored on the persistent storage device 63.

The multiresolution server 59 may store the model on the persistent storage 63 using a commercial database management system, e.g., Oracle from Oracle Corporation of Redwood Shores, Calif. or ObjectStore from Excelon Corp. of Burlington, Mass. The database management system provides access and concurrency control to the quad-trees and topology graphs that form a model.

Tree Creation Server 61

Returning now to FIG. 1. The tree creation server 61 provides services for building the multiresolution representation of new surfaces. The application 51 initiates a request to the tree creation server 61 to create a new multiresolution surface to be transmitted to the model server 59.

The tree creation server starts the process of updating the database in the multiresolution model server 59 by issuing a "begin transaction" command to the database management system.

Figure 14:
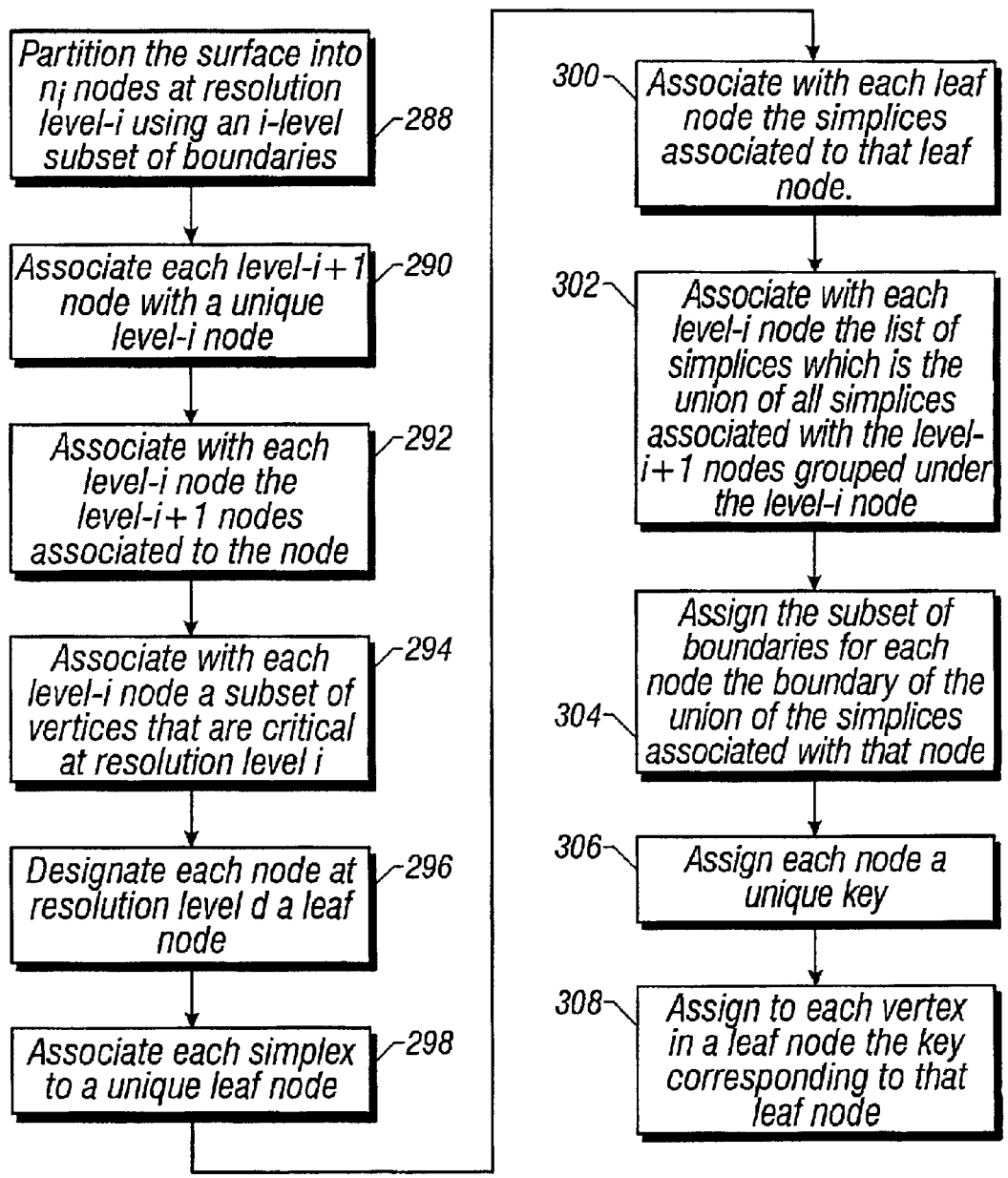
FIG. 14 is a flowchart illustrating the surface partitioning method performed by the tree creation server of the distributed multiresolution geometry modeling system.

The process begins with the surface being partitioned into $n_i$ nodes at resolution level-i using an i-level subset of boundaries 288, as shown in FIG. 14. Each level-i+1 node is associated with a unique level-i node 290. Each level-i node is associated with the level-i+1 nodes associated to the node 292. Each level-i node has associated with it a subset of the vertices that are critical at resolution level i 294. Each node at resolution level d is designated a leaf node 296. While the preferred embodiment has leaf nodes at the same level, it is also possible to have leaf nodes at numerous levels of resolution.

Each simplex is associated with a unique leaf node 298. Each leaf node has associated with it the simplices associated to that leaf node 300. Each level-i node has associated with it the list of simplices which is the union of all simplices associated with the level-i+1 nodes grouped under the level-i node 302. The subset of boundaries for each node is assigned to be the boundary of the union of the simplices associated with that node 304. Each node is assigned a unique key and each vertex in a leaf node is assigned a key corresponding to that leaf node 308.

When the tree creation server 61 has concluded the process of partitioning the surface according to the method of FIG. 14, the tree creation server 61 issues a "commit transaction" command to the database management system of the multiresolution server 59.

In an alternative embodiment, the tree creation server 61 may issue "commit transaction" commands at every level as it is being completed or at any increment of level. In such embodiments, the visualization server 53 may access the lower resolution view and cause it to be displayed on a graphics workstation while the rest of the model building continues.

A common aspect of algorithms that use the multiresolution representations according to the invention is a traversal from the root node of a tree to find a node front. A collection of nodes, C, of a tree T is a node front if every leaf node of T has at most one ancestor in C (a node is an ancestor of itself).

Figure 18:
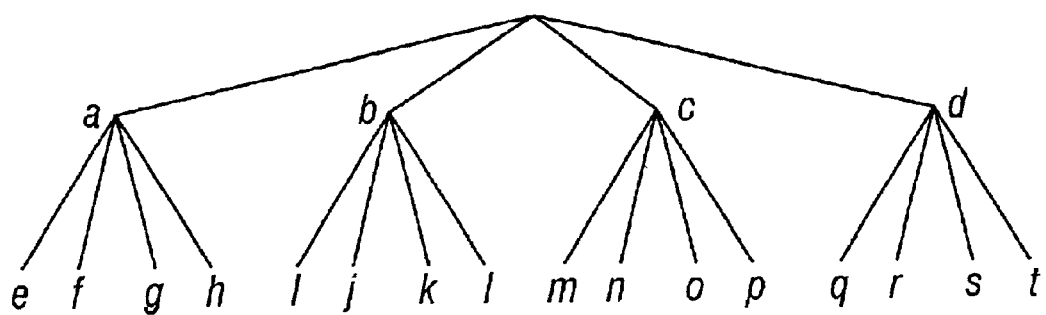
FIG. 18 is an example of a quadtree with leaf nodes at a fixed depth.

FIG. 18 is an example of a quadtree with leaf nodes at a fixed depth. Examples of node fronts are {b,c,q,s,t } and {a,c,d}. Examples of complete node fronts are {a,b,c,d} and {a,i,j,k,l,c,d}. An example of a non-node front is {a,e,b,c,d}. The collection {a,e,b,c,d} is not a node front because "e" does not have a unique ancestor in the collection.

Initially the quad tree resides in a persistent storage 63 on a multiresolution server 59. Only nodes that are encountered during the traversal are transmitted from the multiresolution server 59 to the client, be it the application 51, the geometry server 57 or the decimation server 55. The nodes below the node front are not necessarily transmitted. If a node satisfies a termination criterion of the algorithm, the children of the node will not be traversed and therefore do not need to be transmitted. However, if the termination criterion is not satisfied, the traversal continues with the children of the node. The traversal results in a node front of the tree.

Two exemplary algorithms are presented below, namely, merging a new surface into the model and decimation of a model. In the case of merging a new surface into the model, the termination criterion is that the bounding box of a first node in a quad-tree corresponding to the first surface does not intersect with the bounding box of a second node in the second surface. If that is the case, there is no need to traverse the descendants of either the first or second node. In the decimation algorithm, an error metric (e.g., the difference between the original surface and a decimated approximate surface, or the number of triangles to be displayed) may be used as a termination criterion.

Geometry Server 57

The geometry server 57 performs the boolean operations to update a boundary representation of a model when a new surface is inserted into the model. In summary, this process traverses the quad-trees of each surface and determines at which levels there are intersections. During the traversal, the geometry server 57 requests information about quad-tree nodes from the multiresolution model server 59 on an as needed basis. The descendants of any nodes that do not intersect do not need to be transmitted from the multiresolution server 59 to the geometry server 57. At the leaf resolution level, d, an intersection curve is determined. For each intersecting surface, the geometry server 57 creates new cells that are separated along the intersection curve. Through the process of migration, a new quad-tree for each new cell that results from the intersection of the two surfaces is created corresponding to the new cells.

When the application client 51 requests a new surface to be inserted into the model, the application client 51 transmits a request to that effect to the geometry server 57.

At each quadtree node a bounding box is maintained which is large enough to contain all the simplices assigned to that quadtree node.

To compute the intersection of two surfaces the bounding boxes can be used in a hierarchical manner to compute the quadtree leaf nodes that intersect. At this point, intersecting quadtree leaf nodes are resolved to their individual simplices that are then intersected to determine the intersection curve.

Figure 15A:
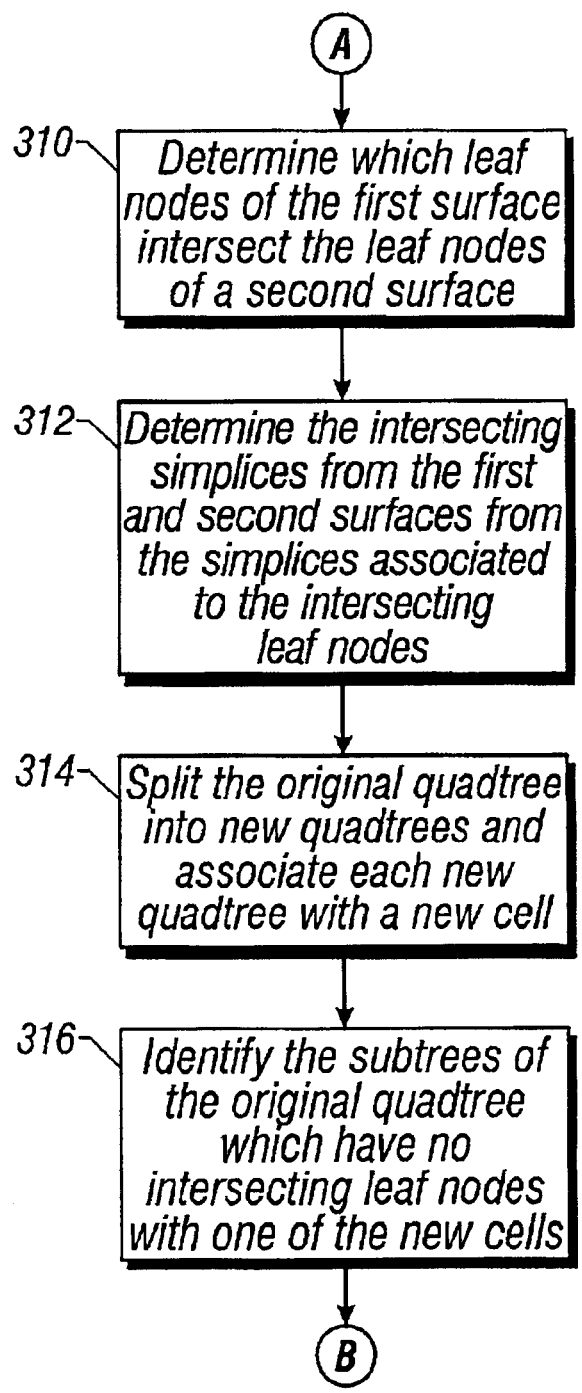
FIG. 15a–b are a flowchart illustrating the method by which a new surface is classified into a model.

Now assume that a second surface is classified into the model. FIG. 15a and b is a flow-chart illustrating the steps of classifying a second surface into the model. It is determined which leaf nodes of the first surface intersect the leaf nodes of the second surface 310.

Consider computing the intersection of two surfaces. This requires loading all pairwise intersecting leaf nodes and then loading the simplices which these leaf nodes contain. This can be done in a recursive manner as follows. Transmit the bounding box for the root node of each quadtree of each surface from the multiresolution model server 59 to the geometry server 57. If there is no intersection between the bounding boxes then the two surfaces do not intersect. If there is an intersection choose one of the nodes and load its children's bounding boxes and mark the node's bounding box for removal from memory. Now intersect the children's bounding boxes with the bounding box of the node from the other tree. If there is an intersection then recurse down the branches of the trees by loading the bounding boxes of the children nodes and intersecting with the bounding boxes from the other tree until the leaf nodes are reached. If there is no intersection then stop the recursion. This results in pairs of intersecting quadtree leaf nodes. Now transmit all the simplices which are contained in the leaf nodes from the multiresolution model server 59 to the geometry server 57.

Figure 16:
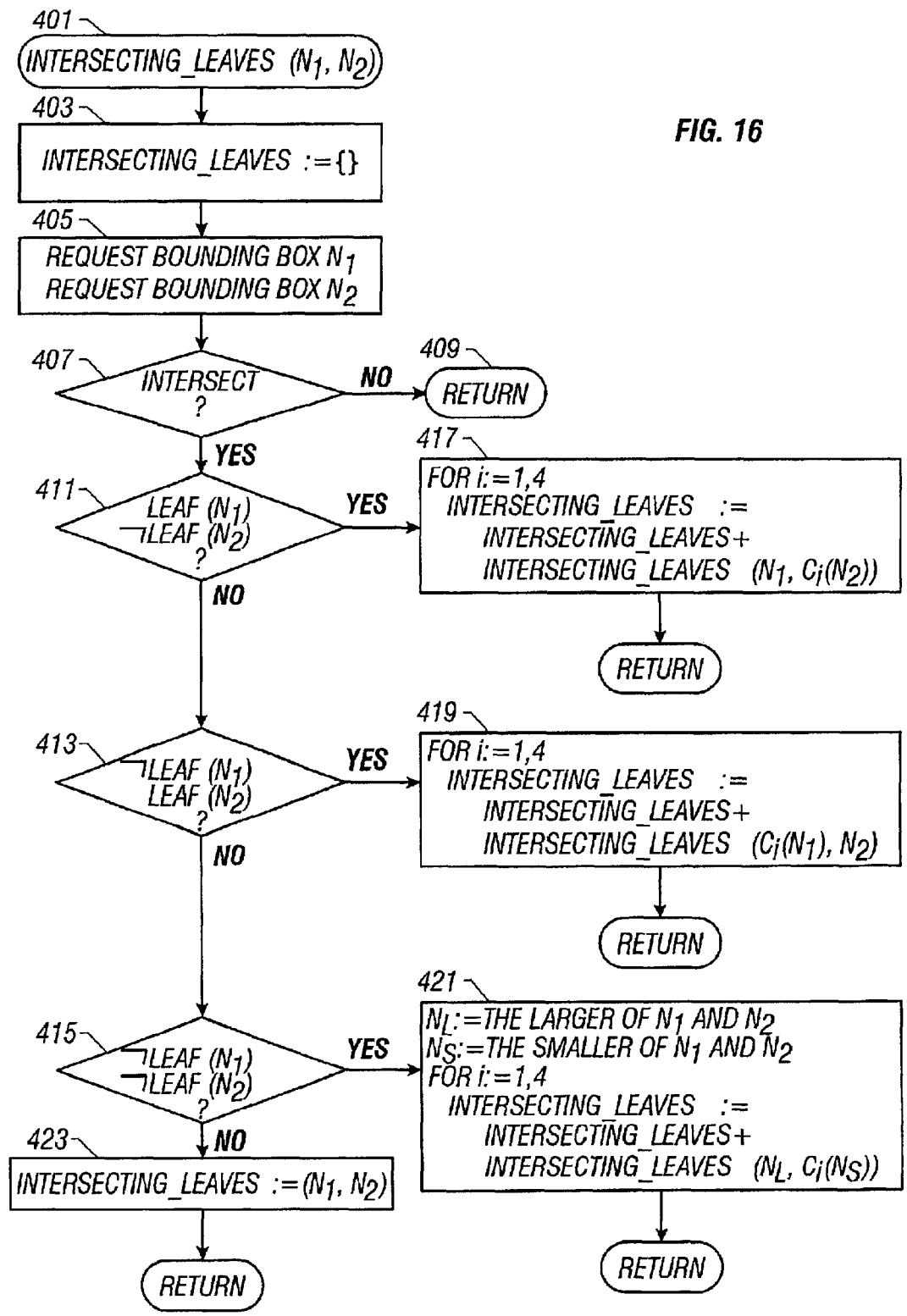
FIG. 16 is a flowchart illustrating the method by which the geometry server determines the list of intersecting leaf nodes when classifying a new surface into a model.

FIG. 16 is a flow chart illustrating an example recursive tree traversal algorithm for determining the intersecting leaf nodes of the two quad trees. An implementation of the algorithm may be a recursive function that returns a list of ordered pairs in which each ordered pair is a leaf node of the first tree intersecting with a leaf node of the second tree.

The algorithm accepts as inputs two nodes (N1 and N2), one from each quad tree, step 401. Recursive functions call themselves until a terminating condition has been arrived at. The intersecting_leaves recursive function has two terminating conditions: (1) the nodes N1 and N2 do not intersect, and (2) the nodes N1 and N2 are both leaf nodes. In all other cases (namely, neither is a leaf node, N1 is a leaf node but N2 is not a leaf node, and N1 is not a leaf node but N2 is a leaf node), the tree traversal continues recursively.

As a first step the list of intersecting leaf nodes to be returned is initialized to the empty set, step 403. Next the geometry server 57 requests the bounding boxes of nodes N1 and N2 from the multiresolution model server 59.

If it is determined that the bounding boxes do not intersect, step 407, then nodes N1 and N2 do not contain simplexes that intersect. Therefore, there is no need to transmit any information about the children of N1 and N2 from the multiresolution server 59. Accordingly, the function returns an empty list, step 409.

Otherwise, there may be descendant leaf nodes of N1 that intersect with descendant leaf nodes of N2. There are four possible combinations of N1 and N2: N1 is a leaf and N2 is not a leaf, N1 is not a leaf and N2 is a leaf, neither N1 nor N2 is a leaf, and both are leaves. Which case applies is determined by decision logic 411, 413, and 415. For the cases where either or both N1 and N2 are not leaf nodes, the intersecting leaves function is called for the children of N1 or N2, respectively, steps 417, 419, and 421, wherein the notation $C_i(Nx)$ denotes the i-th child of node Nx.

If both N1 and N2 are leaf nodes, the intersecting_leaves function returns the ordered pair (N1, N2), step 423.

Thus, the traversal of the two quad-trees according to the method of FIG. 16 determines a complete node-front in each of the quad-trees. The algorithm avoids transmitting any information about descendants of non-intersecting nodes.

Returning now to FIG. 15a, the intersecting simplices from the first and second surfaces are determined from the simplices associated to the intersecting leaf nodes 312. The original quadtree is split into new quadtrees and each new quadtree is associated with a new cell 314. The subtrees of the original quadtree which have no intersecting leaf nodes are identified with one of the new cells 316.

The geometry server 57 transmits to the multiresolution server 59 the nodes that need to be split. The descendants of each node that is not split will continue to belong to the same quad tree as that node. Thus, it is not necessary to transmit any information about those descendants from the geometry server 57 to the multiresolution server 59.

Figure 15B:
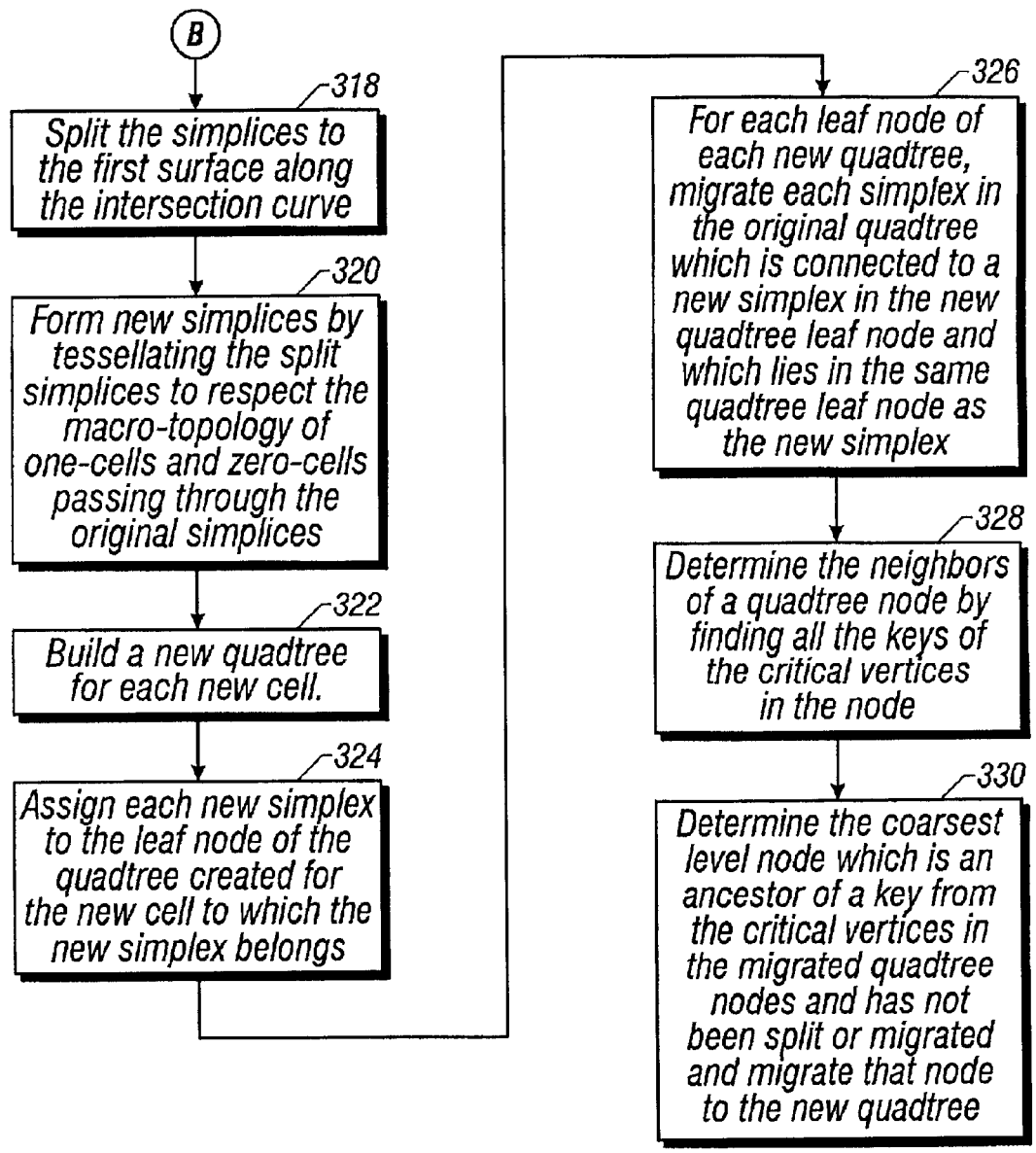

The simplices of the first surface are split along the intersection curve 318, as shown in FIG. 15b. New simplices are formed by tessellating the split simplices to respect the macro-topology of one-cells and zero-cells passing through the original simplices 320. A new quadtree is built for each new cell 322. Each new simplex is assigned to the leaf node of the quadtree created for the new cell to which the new simplex belongs 324. For each leaf node of each new quadtree, each simplex in the original quadtree which is connected to a new simplex in the new quadtree leaf node and which lies in the same quadtree leaf node as the new simplex is migrated 326. The neighbors of a quadtree node are determined by finding all the keys of the critical vertices in the node 328. The coarsest level node which is an ancestor of a key from the critical vertices in the migrated quadtree nodes and which has not been split or migrated is determined and migrated to the new quadtree 330.

The distributed access algorithm described above for the intersection algorithm can be applied to all algorithms which reference information in the hierarchical surface. In particular, it can be applied to the migration algorithm where nodes, simplices and vertices can be selectively transmitted from the multiresolution model server 59 to the geometry server 57.

Visualization Server 53 and Decimation Server 55

The application client 51 may also control the rendering of a model on a graphics terminal. The actual visualization of the model is controlled by the visualization server 53. A user interacts with the model and controls the modeling process through the application client 51 and visualization server 53. The user can visualize the model during the modeling process. Another control available to the user may be camera location which the user controls through certain mouse actions. The visualization server 53 registers the user interface events that it is interested in. If one of those events occur, the application client 51 transmits the event to the visualization server 53.

One important aspect of the visualization of multiresolution models is the construction of consistent decimated views of the model. To obtain such a consistent decimated view of the model the visualization server 53 transmits a request for a decimated model from the decimation server 56. The decimation server requests a partial load of the model from the multiresolution server 59 according to the algorithm described herein below.

Figure 17:
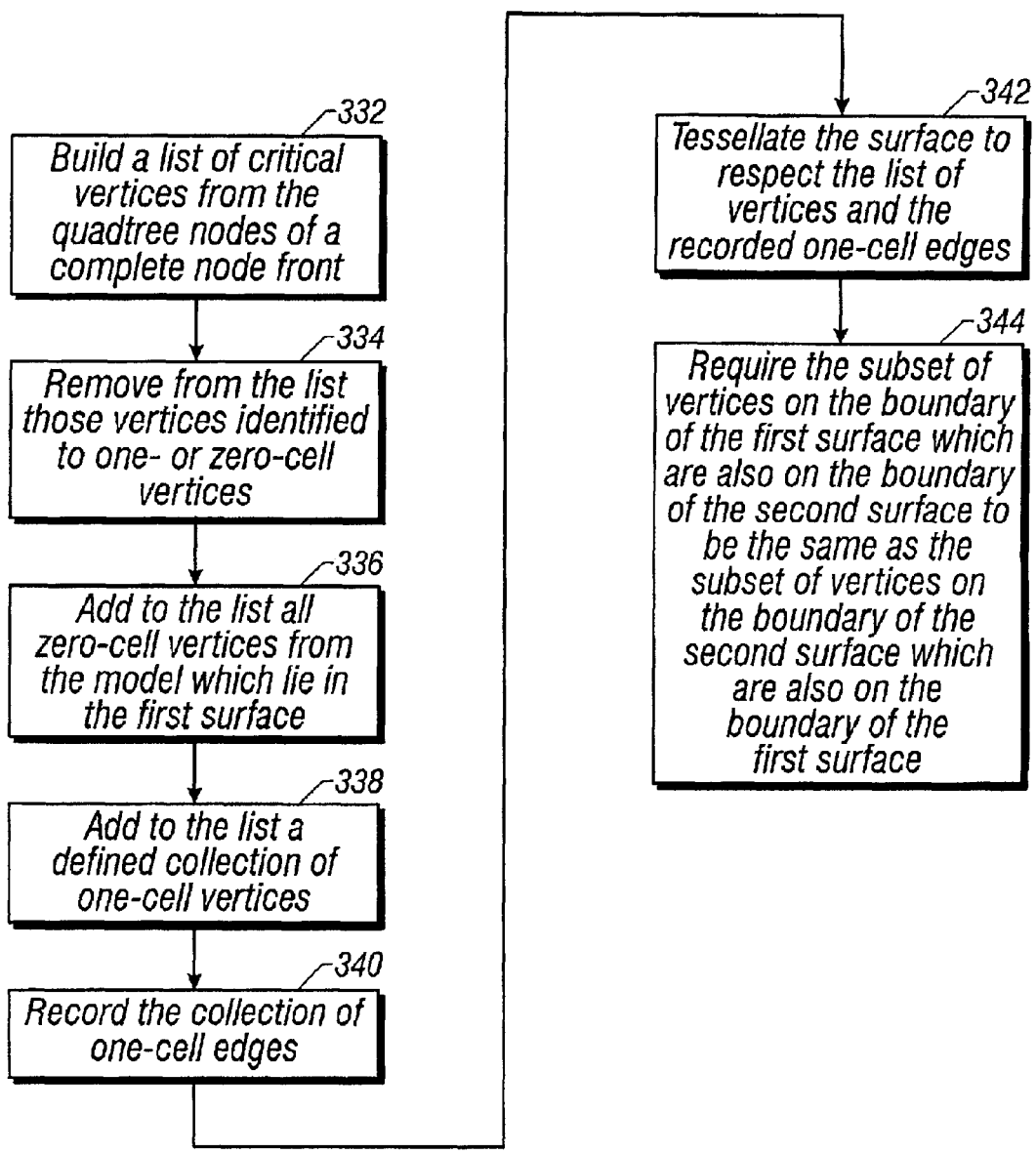
FIG. 17 is a flowchart illustrating the method by which the decimation server decimates a model preserving intersection curves.

Decimation begins with a list of critical vertices being built from the quadtree nodes of a complete node front 332, as shown in FIG. 17.

The vertices identified to one- or zero-cell vertices are removed from the list 334 (FIG. 17). All zero-cell vertices from the model which lie in the first surface are added to the list 336. A defined collection of one-cell vertices is added to the list 338. The collection of one-cell edges is recorded 340. The surface is tessellated to respect the list of vertices and the recorded one-cell edges 342. A requirement is imposed that the subset of vertices on the boundary of the first surface which are also on the boundary of the second surface be the same as the subset of vertices on the boundary of the second surface which are also on the boundary of the first surface 344.

Figure 19:
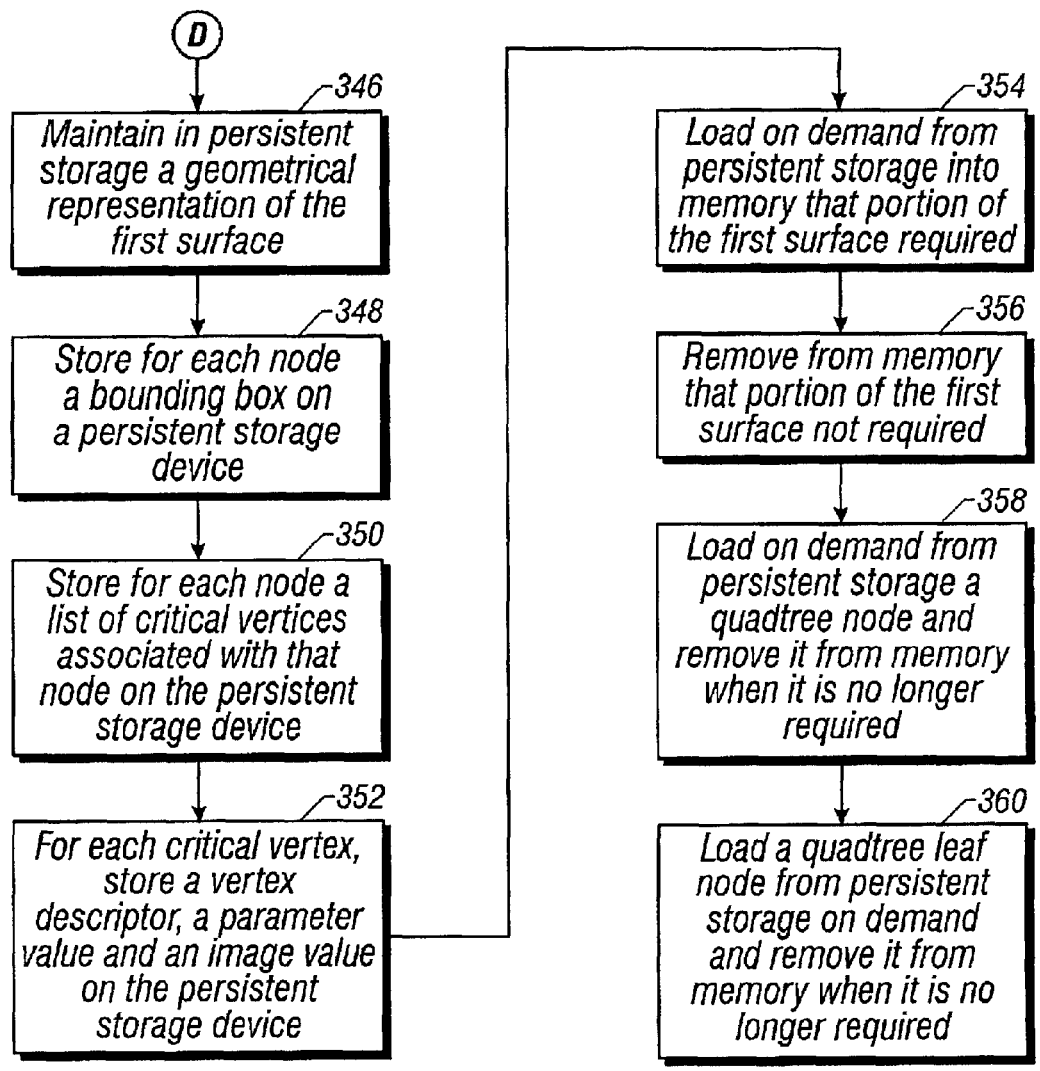
FIG. 19 is a flowchart illustrating the memory management of the distributed multiresolution modeling system of FIG. 1.

A first surface is partitioned into $n_i$ nodes at resolution level-i using an i-level set of boundaries step 288 (FIG. 14). A geometrical representation of the first surface is maintained in persistent storage 63, step 346 (FIG. 19). For each node, a bounding box is stored on a persistent storage device 63, step 348. For each node, a list of critical vertices associated with that node is stored on the persistent storage device 63, step 350. For each critical vertex, a vertex descriptor, a parameter value and an image value are stored on the persistent storage device 63, step 352. The required portion of the first surface is transmitted on demand from the multiresolution server 59, step 354 and that portion of the first surface not required is discarded from the decimation server 55, step 356. Similarly, a quadtree node is transmitted on demand from multiresolution server 59, step 358, and removed from the decimation server 55 when it is no longer needed 358. A quadtree leaf node is transmitted on demand from the multiresolution server 53 to the decimation server 55 and removed from the decimation server when it is no longer needed, step 360.

In this way memory usage and communication bandwidth is conserved, and furthermore changes to the model are limited to the particular collection of sub-volumes specified.

Even with the ability to selectively load geometry at the macro-topological level there is still a memory usage and communications bandwidth problem. For example, the user of the system 101 may want to load the whole earth model and view it. Using the multiresolution hierarchy it is possible to selectively load portions of the geometry of the surfaces from the multiresolution server 59. For a user who is viewing the whole earth model it is not necessary to load the fine details of the model. It is sufficient to load a collection of nodes from the coarse levels of the quadtrees to give a good approximation to the earth model. For a user who is viewing a small part of the whole earth model, it is not necessary to load the finer levels of the quadtrees not in the viewing volume.

Thus, the application client 51 may make requests for a decimated view of the model directly from the decimation server 55 or request partial loads of the model from the multiresolution server 59 and may transmit incremental updates to the multiresolution server 59.

To achieve optimum performance, it is essential, when local changes are made to the model, that it is possible to map these changes to local updates in the persistent storage. An example of a local change is to modify the (x,y,z) position of a vertex. To maintain efficient persistent storage, it is essential this (x,y,z) position is at a limited number of locations in persistent storage, and preferably should be at a unique location. The mapping architecture is described below and is achieved by mapping the quadtree structure to persistent storage.

The quadtree leaf node has an additional component beyond the other nodes in the tree and that is the mesh representation of the node. This is a simple list of triples of indices specifying the indices into the critical vertices, edge vertices and internal vertices of this quadtree node. A grid representation of a surface is stored, the grid being made up of grid cells 370. A mesh representation of a portion of the surface is then formed by triangulating a subset of the grid cells 172.

Since the quadtree leaf node must contain the list of simplices, the mesh content of the leaves is stored in a separate location on the disk. This storage is implemented using a blocked linked list. This allows maximum flexibility for adding and deleting simplices from the database, but provides an efficient means to load a particular leaf node.

To insure the integrity of the model, updates to the model from transactions that make modifications on the model are made after the calculation has been successfully completed on the client. If the calculation fails, the updates are discarded before a commit transaction command is transmitted to the multiresolution model server 59 and the model on the persistent storage 63 remains unmodified.

The invention has application outside the field of geological modeling. In particular, the invention has application in any field in which data are presented geometrically and graphically at more than one level of resolution. For example, the invention would be useful in representing medical models, such as those developed in magnetic resonance imaging ("MRI"). Further, the invention would be useful in representing computer aided design ("CAD") models.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

What is claimed is:

1. A geometry modeling system having a first computer and a second computer connected over a computer network, comprising:
    a database management system on the first computer for providing access to a multiresolution geometry model, wherein the model contains:
        a topological representation of a boundary representation; and
        an hierarchical tree representation of surfaces wherein each lower level in the tree represents a finer level of resolution and each higher level in the tree represents a coarser level of resolution, and the highest level being the root node of the tree;
    a client program on the second computer containing instructions to:
        access the database management system, wherein the client program contains instructions to request the database management system to transmit nodes beginning at a high level of the tree and ending at a low level of the tree when a termination criterion has been achieved;
        perform boolean operations on the multiresolution representation of at least one surface of the model;
        transmit a result from the boolean operations to the database management system.

2. The geometry modeling system of claim 1, wherein the client program further comprises instructions to:
    partition the surface into multiple levels of nodes wherein the root node represents the coarsest level of resolution and each next level away from the root node represents a finer level of resolution;
    store a bounding box for each node in the tree corresponding to a surface wherein the bounding box is sized to contain all simplices of the surface representation at the level of the node;
    update the model to include a new surface by:
        traversing the hierarchical tree representation of a first surface in the model and the hierarchical tree representation of the new surface beginning at a root node of each tree and successively visiting nodes in each hierarchical tree representing higher levels of resolution;
        during the tree traversal, requesting from the database management system a bounding box for each node visited in each hierarchical tree;
        if the bounding boxes do not intersect, do not continue the traversal to descendant nodes; and
        if the bounding boxes intersect, visit descendant nodes of at least one node from one of the hierarchical trees.

3. A geometry modeling system having a first computer and a second computer connected to the first computer over a computer network, comprising:
    a database management system on the first computer for providing access to a multiresolution geometry model, wherein the model contains:
    a topological representation of a boundary representation; and
    an hierarchical tree representation of surfaces wherein each lower level in the tree represents a finer level of resolution and each higher level in the tree represents a coarser level of resolution, and the highest level being the root node of the tree;

a decimation program executing on the second computer and having instructions to:

traverse the hierarchical tree for a first surface and of a second surface of a model;

during the traversal request quad-tree nodes from the database management system from each of hierarchical tree;

terminate the traversal when a terminating criterion has been satisfied;

tesselate the surfaces thereby producing a set of vertices for each surface;

ensure an equality between the vertices of the first surface on a boundary of the first surface that are also on a boundary of the second surface and the vertices of the second surface that are on a boundary of the second surface that are also on a boundary of the first surface.

4. A distributed multiresolution modeling system having a first computer and a second computer connected by a computer network, comprising:

a database management system on the first computer for providing access to a multiresolution geometry model, wherein the model contains:

a topological representation of a boundary representation; and an hierarchical tree representation of surfaces wherein each lower level in the tree represents a finer level of resolution and each higher level in the tree represents a coarser level of resolution, and the highest level being the root node of the tree;

a geometry server program operating on the second computer and having instructions to access the database management system to build and to update the model;

a visualization program operating on a third computer and having instructions to access a decimated view of the model from the database management system wherein the decimated view of the model is obtained by traversing the hierarchical tree representation until a termination criterion has been satisfied, wherein the visualization program and the geometry server program may concurrently access the model whereby the visualization program may access the decimated view while the model is being built.

* * * * *